(No Model.)

G. W. BEDBURY.
CAR AXLE.

No. 275,324.  Patented Apr. 3, 1883.

WITNESSES.
F. G. Watkins
Wm. T. R. Nicholson

INVENTOR
George W. Bedbury
By D. P. Kennedy
his attorney

UNITED STATES PATENT OFFICE.

GEORGE W. BEDBURY, OF PORTLAND, OREGON, ASSIGNOR OF ONE-THIRD TO E. J. HAIGHT AND L. M. COX, BOTH OF SAME PLACE.

CAR-AXLE.

SPECIFICATION forming part of Letters Patent No. 275,324, dated April 3, 1883.

Application filed December 9, 1882. (No model.)

*To all whom it may concern:*

Be it known that I, GEORGE W. BEDBURY, a resident of the city of Portland, in the county Multnomah and State of Oregon, have invented certain new and useful Improvements in Car-Axles, of which the following is a specification.

My invention relates to constructing the axles of railroad-cars in two pieces—that is, the axle is constructed and arranged in the center so that the wheels on either side of the car can revolve independent of those on the other side; and the main object of my invention is to permit the wheels on one rail of the track to revolve faster or slower than those upon the opposite rail, and thus overcome the wear and tear upon car-wheels and the track-rails, resulting from the friction caused in running around curves upon railroad-tracks. By thus constructing a car-axle I obviate all danger of breakage and wear and tear upon both the rolling stock and the rails.

Figure 1:
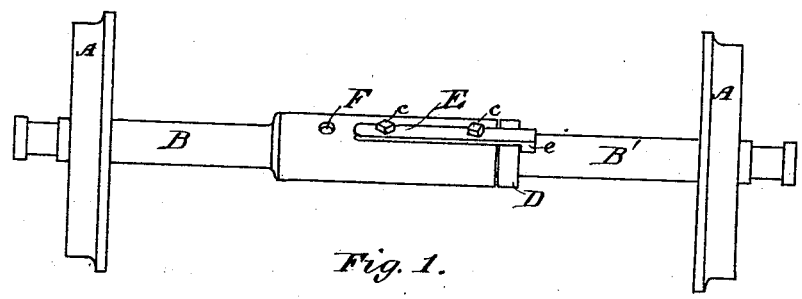
Figure 2:
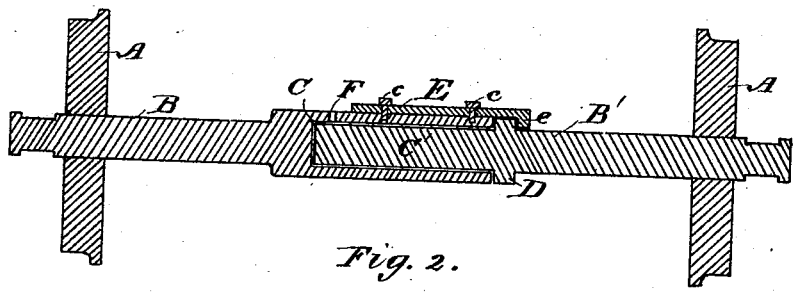

In the accompanying drawings, forming part of this specification, Figure 1 is a view in front elevation of my invention, and Fig. 2 is a sectional view thereof.

A represents the car-wheels of the usual style, and permanently attached to the axle.

B B' represent the axle, the half B being constructed with a socket, C, to receive the journal C' of part B', the inner side of said socket C being constructed smooth to allow the journal C' to rotate therein when necessary. Part B' has a collar, D, formed thereon, which collar fits against the ends of the socket C of part B.

E is a clamp or confining device, which is bolted to the part of axle B by bolts and nuts *c c*, the heads of these bolts *c c* being countersunk in the upper side of socket C. Clamp E has formed upon its end a projection, *e*, between which projection *e* and the ends of socket C the collar D rotates. The car-axle is attached to the truck by the usual style of box. In constructing the clamp E, I do not confine myself to any particular means of retaining the clamp in position.

F represents an aperture by which the journal C' can be lubricated within socket C.

The operation of my invention is as follows: In running around a curve in the track of the railroad the wheels upon the inner curve will rotate faster than those upon the outer curve by the rotating of the part B' within socket C of part B, and will gain upon the wheels of other side of train. Heretofore in running around curves, when using the old style of axle, there was a tendency to make the wheels upon the inner curve slide upon the rail, thereby acting as a brake upon the speed of the train, besides causing friction and wear upon the rolling stock and rails.

I do not claim, broadly, the invention of a combined solid and tubular axle, the wheels thereto revolving independently; nor do I broadly claim a clamp securing these parts together.

Having described my invention, what I claim as new, and desire to secure by Letters Patent, is—

In a car-axle, in combination, parts B B', socket C, journal C', collar D, clamp E *e*, adapted to receive collar D, and nuts *c c*, substantially as hereinbefore set forth.

GEORGE W. BEDBURY.

Witnesses:
F. G. WATKINS,
W. H. ADAMS.